Figure 1:
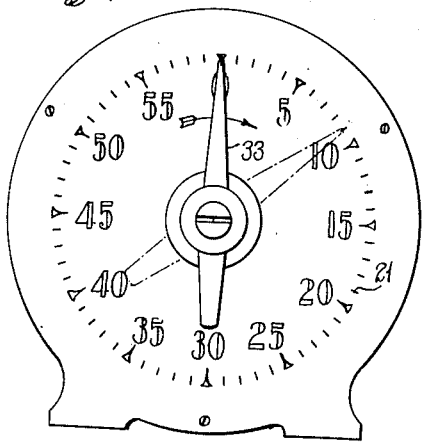
Figure 2:
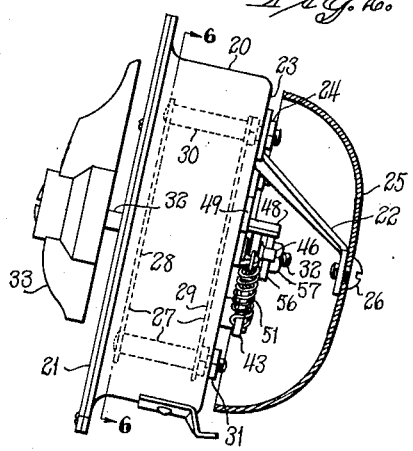
Figure 3:
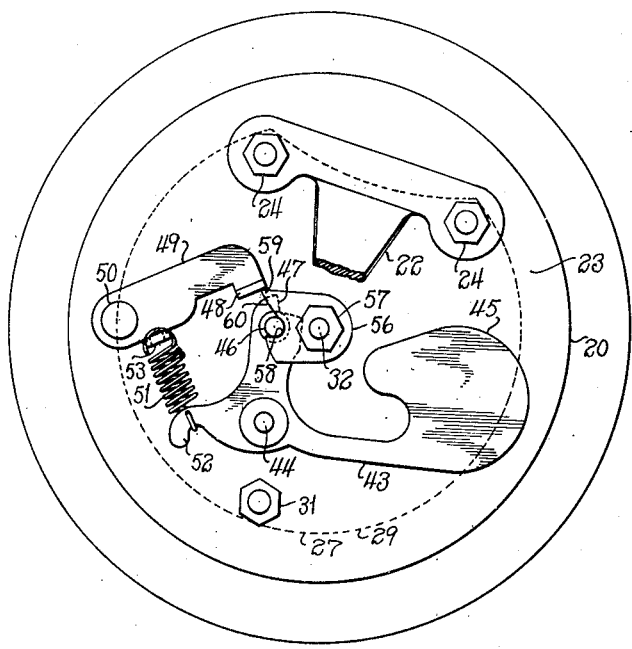
Figure 10:
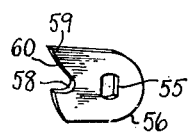
Figure 11:
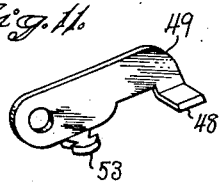

Patented Oct. 7, 1941

2,258,468

UNITED STATES PATENT OFFICE 2,258,468

AUTOMATIC ELECTRIC ARC FURNACE ELECTRODE CONTROL

William Harvey Payne, La Grange, Ill.

Application May 20, 1940, Serial No. 336,107

3 Claims. (Cl. 13—14)

This invention relates to a new and useful improvement in electrode controls and has for one of its chief objects of advantage and importance the provision of means for utilizing a light-weight low inertia counterbalancing medium to facilitate adjustment movement of associated electrodes and electrode supporting arms.

In an arc melting electric furnace of improved design it is customary to construct the furnace in such a way as to provide a crucible and roof lined with refractories in which the charge is melted and finished. In such a furnace, electric heat is applied by arcing to the scrap and slag, the current being taken into the furnace through graphite or similar electrodes which in turn are clamp-supported to separate movable electrode arms which are mounted to slide up and down upon columns or suitable supporting members fastened to the side of the furnace shell or parts thereof.

In the case of a three-phase arc furnace, each of the electrodes is individually power raised and lowered by means of cables or similar mechanical connections running to a motor driven electric winch or a reversible prime mover of like character. For hand control of the electrodes, the prime mover is hand-switched to raise or lower the electrodes as the furnace operator may wish. The electrodes are thus hand-controlled for all adjustments for charging, repairs, replacements, and the like, but are automatically moved for the actual furnace melting operations.

Where an electric furnace is employed for melting down scrap or like irregular bodies or lumps of metal, the material presents very broken or irregular contact surfaces causing rapid and irregular electrode movements as the material melts down into a liquid body. Since the surface of the metal itself acts as one of the spark poles for the gap from the lower end of the electrode, it is evident that provision must be made for approximately constantly adjusting the height of the electrode in order that a uniform gap may be maintained between the electrode and the closest point to the mass of changing metal. From the beginning of a melting operation, such scrap will present points or projections with which the arc is established. As the melting progresses, the arc from each electrode will progressively melt its hole or cavity through the scrap. The electrode passes down through the scrap charge very quickly. Molten metal, from these three first holes through the scrap charge, collects on the furnace bottom. Thus within about 15% of total melting time, the electrodes pass through the cold charge and arc to the then formed pool of molten metal and slag on the furnace hearth, and from that time to the completion of the melting of the scrap this electric heat is put in underneath the remaining, bridged, charge above. Finally, this bridged scrap falls in. These large sections may fall against one or two electrodes, causing substantial short circuits and surging therefrom. These changes radically alter the arcing conditions within the furnace so that quick adjusting movements of the electrodes are necessary in order to maintain each electrode at the intended arcing distance. Especially quick and extensive automatic movements of the electrode are very desirable where scrap falls in as recited above.

Since the volume of current flow in amperes is ordinarily in inverse ratio to the length of the gap, it is evident that a control of this gap distance may be effected by means which are responsive to a variation in the current flow. Current input to such an arc furnace has low voltage, high current characteristics and therefore requires electrode diameters and electrode supporting clamps and arms of considerable size. Consequently, the combined weight of these movable parts is relatively great.

Conventional means of moving these very heavy electrodes and electrode arms consist of a motor winch, or a hydraulic system directly connected to each electrode arm. Such direct connected prime-movers have to be very heavy to handle the big loads, and the inertia of the heavy reversing prime-movers is a handicap to efficiency of the operations involved.

Still another system uses an equally average heavy counterbalancing weight on one end of a cable, with the heavy electrode and arm on the other end of the cable. The prime-moving motor winch for this system can then be lighter because it has a weight counterbalanced load.

The principal object of the invention disclosed below consists of using a light weight, low inertia compressed gas in one end of a fixed cylinder, the piston and rod of which are operably connected to continuously push up against the weight of the arcing electrode and arm combination. This is a low inertia counterbalancing system as distinguished from the non-counterbalanced and heavy weight counterbalanced systems used on electric arc melting furnaces as described above.

In this new system of low inertia counterbalancing of a reversing electrode arm movement Consequently, inertia of the counterbalancing medium here employed is easily overcome. Accordingly, there is herein provided an economical and efficient device for quickly adjusting electrodes to a desired operable position with a minimum amount of energy.

It will also be apparent from the foregoing that the counterbalancing mechanism here set forth may be readily installed in devices now in operation or may be built into new structures.

It will also be apparent to those skilled in the art to which the improved device appertains that numerous changes and alterations in construction may be made without departing from the spirit and scope of this invention. Accordingly, the patent granted hereon is not to be limited to the preferred embodiment here shown nor in any other manner except as is necessitated by the terminology of the appended claims when given the range of equivalents to which they may be entitled.

I claim as my invention:

1. In an electric arc furnace, the combination of a supporting frame-work, a member guided for vertical movement with respect thereto, an electrode supporting arm secured to said member and an electrode carried thereby, reversible unyielding means for applying a positive raising or a positive lowering force to said member and the supporting arm and electrode carried thereby, and means including a closed container system confining a gas under pressure therein and adapted to apply a substantially constant lifting pressure to said member for counterbalancing the weight of said member and the parts supported thereby.

2. In an electric arc furnace, the combination of a supporting frame-work, a member guided for vertical movement with respect thereto, an electrode supporting arm secured to said member and an electrode carried thereby, reversible unyielding means for applying a positive raising or a positive lowering force to said member and the supporting arm and electrode carried thereby, and a closed container system confining a gas under pressure therein and adapted to apply a substantially constant lifting pressure to said member for counterbalancing the weight of said member and the parts supported thereby, said closed container system including a cylinder and piston positioned to receive an upward thrust from said gas under pressure connected between said framework and said member.

3. In an electric arc furnace, the combination of a supporting frame-work, a member guided for vertical movement with respect thereto, an electrode supporting arm secured to said member and an electrode carried thereby, reversible unyielding means for applying a positive raising or a positive lowering force to said member and the supporting arm and electrode carried thereby, and a closed container system confining a gas under pressure therein and adapted to apply a substantially constant lifting pressure to said member for counterbalancing the weight of said member and the parts supported thereby, said closed container system including a cylinder and piston positioned to receive an upward thrust from said gas under pressure connected between said framework and said member, and also including a surge tank of sufficient capacity to counteract any substantial variation in the pressure of the gas occasioned by movements of the piston.

WILLIAM HARVEY PAYNE.

Oct. 7, 1941.  C. B. SIMMONS  2,258,474
INTERVAL TIMER
Filed Jan. 15, 1938    3 Sheets-Sheet 1

Inventor
Charles B. Simmons,
By Seymour Earle Nichols
Attorneys